United States Patent [19]

Gold

[11] Patent Number: 4,652,388

[45] Date of Patent: Mar. 24, 1987

[54] MAGNETIC TAPES

[76] Inventor: Marvin H. Gold, 5050 Dory Way, Fair Oaks, Calif. 95628

[21] Appl. No.: 593,084

[22] Filed: Mar. 26, 1984

[51] Int. Cl.$^4$ .................. C04B 35/04; H01F 1/00; H01F 1/26

[52] U.S. Cl. .................. 252/62.54; 428/694; 428/900

[58] Field of Search .......... 252/62.54, 62.53, 62.51 R, 252/52, 55

[56] References Cited

U.S. PATENT DOCUMENTS

| | | | |
|---|---|---|---|
| 3,467,598 | 9/1969 | Kroenke | 252/62.54 |
| 3,592,687 | 7/1971 | Scifnell et al. | 252/62.54 |
| 3,684,771 | 8/1972 | Braun | 252/62.54 |
| 3,788,996 | 1/1974 | Thompson | 252/62.54 |
| 3,821,025 | 10/1974 | Akashi et al. | 252/62.54 |
| 4,334,887 | 6/1982 | Frank et al. | 252/62.54 |
| 4,413,070 | 11/1983 | Rembaum | 252/62.54 |

FOREIGN PATENT DOCUMENTS 482897  4/1938  United Kingdom .

*Primary Examiner*—Arthur P. Demers
*Attorney, Agent, or Firm*—Mark C. Jacobs

[57] ABSTRACT

Aqueous dispersion coatings as binders for magnetic particles in the manufacture of audio, video and data processing magnetic media.

22 Claims, No Drawings

MAGNETIC TAPES

FIELD OF INVENTION

This invention pertains to magnetic media and the process of making same.

BACKGROUND OF THE INVENTION

Many patents have been issued pertaining to the manufacture of magnetic media such as audio tape, video tape, floppy discs and hard discs for computers and the like. Such giants of industry around the world as Three M Company and Ampex in the U.S.A., B.A.S.F. in Germany and Sony, JVC and Fuji in Japan are among the many companies producing such products.

In all the products being currently produced organic solvent systems are employed. Today's health and safety requirements greatly add to the cost of these magnetic media due to the implementation of solvent recovery systems. Also the loss of solvent due to volatilization, if there is no recovery system, is not only a health hazard to workers, but is of great expense to the manufacturer; and the fire and explosion hazard which effects insurance costs. Air pollution prevention means, such as scrubbers for removal of organic vapors are high in cost.

There is a need, therefore, for a mechanism to reduce such added manufacturing costs. Such a procedure is found in the instant invention which eliminates the use of organic solvents.

It is an object of this invention to provide a binder system for magnetic particles that is free from organic solvent.

It is another object to provide a binder system for magnetic particles comprising an aqueous dispersion.

Yet another object is to provide a water based binder for magnetic particles that gives rise to excellent adhesion between said particles and the coating substrate (base).

It is a yet further object to prepare a water based dispersion magnetic media that is suitable for full range recording and reproduction.

A still further object is to provide lower cost, high quality magnetic tapes for audio and video and computer useage as well as floppy and rigid metallic discs.

Other objects of the invention will in part be obvious and will in part appear hereinafter.

The invention accordingly comprises the several steps and the relation and order of one or more of such steps with respect to each of the others and the products possessing the features, properties and relation of elements which are exemplified in the following detailed description and the scope of the application of which will be indicated in the appended claims.

For a fuller understanding of the nature and objects of the invention, reference should be had to the following detailed description.

KNOWN PRIOR ART

Applicant is aware of U.K. Pat. No. 482,897 assigned to I. G. Farlen Industries in 1938. This patent described the function of methylol derivatives of acrylamide and methacrylamide and their respective polymers and copolymers. The products of the reference are significantly different from those prepared herein in that the end products are a heat treated, cross linked, insoluble end product.

SUMMARY OF THE INVENTION

Coating compositions are disclosed for application upon a suitable base material for the preparation of magnetic tapes, magnetic films and magnetic discs for the recording of information. The coating is deposited on the film from an aqueous dispersion rather than from an organic solvent.

DESCRIPTION OF THE PREFERRED EMBODIMENT

There are many known disadvantages to the deposition of magnetic films from an organic solvent system. These have been touched on briefly elsewhere herein. When employing the processes disclosed herein however, and the compositions made according to such processes, most if not all of the disadvantages of the solvent based systems can be overcome. The only effluent is water, and in most locations in this country and in other nations, this is not detrimental.

I have found that there are many polymer latices, which when mixed with certain other ingredients, which will be described below, can be used as the main binder for an aqueous based magnetic coating formulation. These various latices include but are not limited to styril, acrylic, vinyl, carbamo, and other main moiety based latices all of which are capable of forming self supporting films. Typical examples of these latices include the following;

Rohm and Haas Rhoplex E-=358
Union Carbide UCAR 366
Union Carbide UCAR 503
Witco Witcobond W-290H
    Witco Witcobond W-234
    Mobay Impranil DLH
    Goodrich Hycar 26091
    Goodrich Hycar 26106
    Goodrich Hycar 26138
    Goodrich Hycar 1577

The first four are relatively soft films, useful in the manufacture of computer and audio media, while the remaining are relatively harder and are suitable for video or high density disc recording.

The above enumerated latices and dispersions and others when employed alone do not provide adequate adhesion characteristics to produce a useful magnetic particle binder, be the particle metal or metal oxide. They must be used in conjunction with a two part additive system hereinafter designated Additives A and B respectively.

Unfortunately, there is no empirical formula for the latices that can be employed in my invention. This is readily seen from the fact that various naming groups can be associated with the polymers employable herein. To be deemed satisfactory ingredients for use in the instant process, the magnetic particle containing films formed from any given polymer must satisfactorily pass a plurality of evaluation tests. These tests are applied not to the basic polymer films but to the end products. Thus when a film forming material is used as a binder for magnetic particles, it must be capable of passing an adhesive tape test, a scratch test, and a crease test. If the end product cannot pass these tests, then the polymeric material is deemed unsatisfactory for the instant technique.

To further complicate the situation, it is seen even the process of making the latex can contribute to its compatibility or lack thereof with Additives A and B. Thus I have found that slightly basic polymer compositions tend to have a better chance of Additive compatibility than do acidic ones.

What I have found therefor is the fact that certain polymer latices when combined in the manner to be described below, with Additives A and B, along with surface active agents, defoamers, lubricants, and other "finishing" agents, can when mixed with magnetic particles yield a film forming composition with sufficient binding of the magnetic particles (metal or metal oxide) to the coating substrate to yield an acceptable media in the format of tape and discs for the recording of information.

ADDITIVE A

A wide variety of compounds are useful as the "Additive A". In general these are monomeric compounds or mixtures thereof. Compositions falling within the formula have the property of being water soluble or at least water dispersable as well as providing a plasticizing effect on the underlying polymer of the commercial latex as well as plasticizing effect on Additive B. The compounds correspond to the general formula:

$$Y-\overset{O}{\underset{}{C}}-\overset{X}{\underset{}{N}}-CH_2-P$$

where Y may be H, $CH_3-$, $C_2H_5-$, $CH_2=CH-$, $CH_2=\overset{CH_3}{\underset{|}{C}}-$, $CH_3\overset{CH_3}{\underset{|}{CH}}-$, $CH_3CH_2CH_2-$, $CH_3CH_2\overset{CH_3}{\underset{|}{CH}}-$, $HOCH_2CH_2-$, $HOCH_2\overset{CH_3}{\underset{|}{CH}}-$, $CH_3OCH_2-$, $CH_3OCH_2CH_2-$, $ZCH_2-$, $Z_2CH-$, $ZCH_2CH_2$ and wherein Z is F or Cl.

P may be represented by polyhydroxybenzene compounds such as, but not limited to, catechol, resorcinol, hydroquinone, t-butyl catechol, hydroxethylresorcinol, among others. P may also be a substituted or unsubstituted o, m or p aminophenols or aromatic diamines. Typical examples include $$Y-\overset{O}{\underset{}{C}}-\overset{X}{\underset{}{N}}-CH_2-N-C_6H_4OH \text{ or}$$

$$Y-\overset{O}{\underset{}{C}}-\overset{X}{\underset{}{N}}-CH_2-\overset{H}{\underset{}{N}}-C_6H_4NH_2$$

wherein X is represented by H—, $CH_3-$ or $HOCH_2CH_2-$ and Y is as defined above.

ADDITIVE B

Additive B is a complex water soluble or water dispersable polymer which has at least five percent (5%) of its monomeric constituents derived from acrylamide or methacrylamide. The remaining approximately ninety-five percent (95%) of the monomers units may be one or more of any vinyl monomer, which is copolymerized with the acrylamide or methacrylamide to yield a water soluble or water dispersable system. This copolymerizate must be further condensed first with formaldehyde and then with any of the polyhydroxy aromatics, aminohydroxy aromatics or diamino aromatice designated as a "P variety" as disclosed under Additive A, above, to yield the final Additive B polymer. Its formula is set forth below:

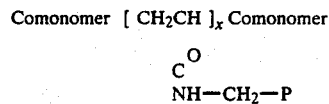

The grouping: P—$CH_2$— must be substituted to the extent of at least five percent (5%) of the total monomeric units in the polymer chain, and up to as high a value as will still yield a water soluble or water dispersable system. This may be anywhere from five percent (5%) to ninety-five percent (95%) depending upon the system involved. However, I have found that the most generally useful materials have a degree of substitution of from twelve percent (12%) to sixty-five percent (65%) and I prefer to use a degree of substitution of from twenty percent (20%) to thirty-five percent (35%). Also I prefer that the monomeric constituents of acrylamide or methacrylamide in the polymer backbone be greater than fifty percent (50%).

Previously I mentioned that I was aware of British Pat. No. 482 897, which describes the formation of methylol derivatives of acrylamide and methacrylamide and their respective polymers and copolymers. The claims in this patent are for a heat treated product which yields a cross-linked insoluble end product.

Contrarily, for my invention I require only to partial substitution of the polymeric amides and only the degree that water solubility or ready water dispersability and swelling is retained.

The following specific examples shall be considered as exemplary of the instant invention. In the first example the term deionized water is utilized. In all the appearances of the word water, it shall be understood that deionized water, i.e. water with a low salt content is contemplated.

PREPARATION OF ADDITIVE A (Adhesive Plasticizer)

EXAMPLE 1A

Condensation of Resorcinol with N-Hydroxymethyl Acrylamide

To 15 g of a commercial 48% N-hydroxymethyl acrylamide was added 15 g deionized water. Thus diluted the solution had a pH of about 4. Then 0.15 ml of 10% sodium hydroxide was added, to raise the pH to 8.5–9. Then 9 g of solid resorcinol was added all at once with stirring. The solution was endothermic and upon completion of the addition the pH had dropped back to 4. Addition of 7 ml NaOH brought the pH back to 8.5–9. After allowing the reaction mixture to age overnight it was ready for use.

EXAMPLE 2A

Condensation of Catechol with N-Hydroxymethyl Acrylamide

In a beaker containing 30 g of 48% N-hydroxymethyl acrylamide was added 30 g water. This solution was made alkaline with 0.3 ml 10% NaOH, prior to the addition of 18 g solid catechol. The solution and reaction of the catechol was endothermic and was aided by heating the beaker on a water bath at 50°–60° C. for about ten (10) minutes. After standing one hour 15 ml more 10% NaOH were required to bring the pH back up to 8.5. After aging overnight the reaction mixture was ready for use.

EXAMPLE 3A

Condenstaion of t-Butyl Catechol with N-Hydroxymethyl Acrylamide

To 10 g 48% N-hydroxymethyl acrylamide was added 10 ml water and 0.1 ml 2.2N NaOH. Then 8 g solid t-butyl catechol was added with stirring while heating on a warm water bath. Two layers were obtained but after addition of 1.5 ml 2.2N NaOH the mixture became clear and formed a homogeneous solution (pH 8.5–9). The mixture was bottled and allowed to age overnight prior to use.

EXAMPLE 4A

Condensation of m-Aminophenol with N-Hydroxymethyl Acrylamide

To a solution of 4.9 m-aminophenol in 25 ml hot water was added 7.5 ml 48% hydroxymethyl acrylamide. The reaction mixture was allowed to cool in a stoppered brown bottle and aged twenty-four (24) hours prior to use.

EXAMPLE 5A

Condensation of m-Toluene Diamine with N-Hydroxymethyl Acrylamide

To a solution of 6.1 g m-toluenediamine in hot water (16 ml) was added 10.5 ml 48% hydroxymethyl acrylamide. Upon cooling the reaction mixture was bottled and stored overnight prior to use.

PREPARATION OF ADDITIVE B (Adhesive Polymers)

Introduction

In the following examples an acrylamide polymer was selected which met two criteria. First, that it could be dissolved in a sufficiently high concentration to yield a reasonable working viscosity; and at the same time there would be provided sufficient residual mass for incorporation with commercial latices to yield optimum adhesion characteristics. A polymer system which satisfies these requirements is American Cyanamide's Cyanomer P-26. It contains some 4 to 6% acrylic acid as a copolymer with the acrylamide. The reactions carried out in the following examples are schematically shown as follows:

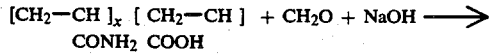

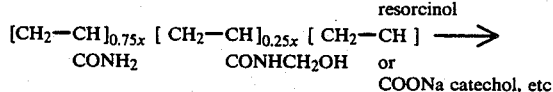

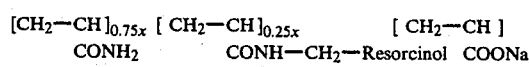

In order to retain aqueous solubility in most cases only about 25% of the amide groups were substituted with the methylene polyhydric phenols (ie. resorcinols, catechols, hydroquinones) or the methylene amino aromatics (ie. aminophenols, diaminoaromatics), as will be seen below.

EXAMPLE 1B

Preparation of Adhesive by Resorcinol Condensation

In a beaker of 160 ml of $H_2O$, 20 g of Cyanomer P-26 was slowly added with mechanical stirring to make sure that complete solution occured. The initial pH was around 5. The addition of 2.5 ml of 1.77N NaOH brought the pH up to 8.5. Then 4.2 ml of 37% formaldehyde solution (enough to replace 25% of the amide groupings) was added and within a few minutes the pH had dropped back to 5. It now required 14 more ml 1.77N NaOH to bring the pH back up to 9 and hold this value for one hour. After such, 5.75 g solid resorcinol was added with stirring. All the resorcinol dissolved to yield a clear solution. The pH dropped back to 8. It then required 15 ml more 1.77N NaOH to bring the pH back up to 8.5. At this point the solution turned from clear to milky opaque. The mixture was bottled and allowed to age overnight before use.

EXAMPLE 2B

Preparation of Adhesive—Resorcinol Condensation (Reverse Addition)

It was found that on a number of occasions tha preparations of adhesive (Additive B) made according to Example 1B would gel shortly after preparation. By carrying out the addition with resorcinol in a reverse manner a free flowing mobile solution was obtained with good reproducibility from batch to batch.

In a beaker, 20 g of Cyanomer P-26 was slowly added to 120 ml water with mechanical stirring. When that solution was complete a measurement was made of the initial p". It was about 5. Then 4.2 ml 37% formaldehyde solution was stirred in followed by 10 ml 2.2N NaOH to bring the pH up to 6. An additional 7 ml of NaOH was required to raise the pH to 10. After standing one hour the viscous mixture was stirred slowly in a thin stream into a solution of 6 g of resorcinol dissolved in 40 ml water. At the end of the addition the pH had dropped to 7.5. The solution required 2 ml of 2.2N NaOH to bring the pH back up to 9. The greatly thinned reaction mixture was bottled and stored overnight prior to use.

EXAMPLE 3B

Preparation of t-Butylcatechol Substituted Adhesive 20 g Cyanomer P-26 was dissolved in 160 ml water with good mechanical stirring. The solution required 6.5 ml of 2.2N NaOH to raise the pH to 8.5-9. To this was added 4.1 ml of 37% formaldehyde and the reaction mixture again became acidic. After standing ten minutes, 9 g of t-butylcatechol was added to yield a milky dispersion. This was followed by 10 ml 2.2N NaOH to bring the pH to 7.5. The dispersion darkened and after fifteen minutes more stirring the pH had dropped to 6–6.5. An additional 2 ml of the NaOH was added to raise the pH to 8.5. This product was bottled and stored prior to use.

EXAMPLE 4B

Preparation of m-Aminophenol Substituted Adhesive

Using a Mixmaster ®, 20 g of Cyanomer P-26 was slowly added to 120 ml of water to yield a somewhat viscous solution. The pH was about 5 and after the addition of 3.5 ml 2.2N NaOH it was raised to 6.5. Then 4.2 ml of 37% formaldehyde was stirred in and the pH immediately dropped back to 5. Additional 2.2N NaOH was added incrementally until a total of 15 ml brought the pH up to 10. During this time and after standing one hour there was an appreciable increase in viscosity. At the end of the hour the mixture was neutralized by the addition of 6.5 ml of 0.5N HCl to pH 7–7.5.

In a separate bowl, 6 g of m-aminophenol was heated with 40 ml water to 60°–65° C. until it was all in solution. This solution was then well stirred while the polymethylolacrylamide solution was slowly added in a thin stream. A clear semi-viscous solution resulted having a pH 8. This was bottled and used in subsequent coating formulations.

EXAMPLE 5B

Preparation of m-Toluene Diamine Substituted Adhesive

The preparation of this formulation was identical to that of Example 4B except that 6.3 g of m-toluene diamine was used in place of the 6 g of m-aminophenol.

PREPARATION OF COATINGS

In general, laboratory batches of coatings formulations were prepared in the following manner:

A requisite amount, as determined by the skill of the art, of magnetic iron oxide was placed in a glass mortar and to this was added surfactants, Additives A and B and water. This mixture was well ground with a glass pestle until a smooth creamy paste was obtained. A proportional amount of commercial latex (or mixture of latices) was added to the paste along with more water and an optional anti-foaming agent. This total mixture was again ground to a very smooth flowable dispersion. The paste was then spread over a film of polyester by means of a doctor blade, allowed to air dry several hours, it was finish dried in an oven at about 85°–90° C. Adhesive characteristics were checked by means of the adhesive tape test, folding and creasing and scratching and lifting with an Xacto ® blade. The coatings, as described in the following examples, responded very well to the tests described above and are useful in the preparation of high quality magnetic coatings.

When magnetic iron oxide was used the following general formulation and
- 5.0 g Magnetic iron oxide
- 4 ml water
- 0.1 ml Aerosol OT
- 0.1 ml MAZAMIDE 80
- 0.35 ml Additive A—from the above
- 0.8 ml Additive B—from the above
- Grind to a smooth paste
- x ml Commercial Latex wherein x varies between about 1.5 to 2.0 ml
- 4 ml water
- 0.05 Surfynol 104A (or other anti-foam known to the art)
- Grind and coat.

The coatings prepared according to the above formulation are summarized in Table I and which are designated 11–22, since 1–5 A and 1–5 B represent 1–10.

TABLE I

| Exple # | Additive A | Additive B | Latex |
|---|---|---|---|
| 11 | Resorcinol-Ex. 1A | Resorcinol-Ex 1B | 1.8 ml Rhoplex E-358 |
| 12 | Resorcinol-Ex. 1A | Resorcinol-Ex 2B | 1.8 ml UCAR 503 |
| 13 | Resorcinol-Ex. 1A | Resorcinol-Ex 2B | 1.8 ml UCAR 366 |
| 14 | Resorcinol-Ex. 1A | Resorcinol-Ex 2B | 1.5 ml Rhoplex E-358 0.5 ml Gen Tac (a) |
| 15 | Resorcinol-Ex. 1A | Resorcinol-Ex 2B | 1.5 ml UCAR 503 0.5 ml Gen Tac (a) |
| 16 | Resorcinol-Ex. 1A | Resorcinol-Ex 1B | 1.5 ml UCAR 366 0.5 ml Gen Tac (a) |
| 17 | Catechol-Ex. 2 | Resorcinol-Ex 1B | 1.5 ml Rhoplex E-358 |
| 18 | " | Resorcinol-Ex 2B | 1.5 ml Rhoplex E-358 0.5 ml Gen Tac (a) |
| 19 | " | t-Bu Catechol Ex 3B | 1.8 ml Rhoplex E-358 |
| 20 | Resorcinol Ex 1A | t-Bu Catechol Ex 3B | " |
| 21 | t-Bu Catechol Ex 3A | Resorcinol Ex 1B | " |
| 22 | t-Bu Catechol Ex 3A | t-Bu Catchol Ex 3B | " |

(a) Gen Tac - General Tire's vinyl pyridine rubber latex
Rhoplex is a trademark of Hohm & Haas
UCAR is a trademark of Union Carbide

EXAMPLES 23–25

These experiments were conducted using higher ratios of magnetic oxide than those in Examples 11–22. Holding all the other ingredients constant, the amounts of magnetic iron oxide were increased to 5.5 g, 6.0 g and 7.0 g. The first two films still provided good adhesive characteristics but the preparation containing 7.0 g of magnetic iron oxide was somewhat dry and not as smooth.

USE OF HARDER POLYMER LATEX SYSTEMS

In the following examples latices were used whose polymers have a high modulus and therefore more applicable for use in video tape formulations. However, while the latices used above had a total solids content of about 55–60% many of the following range in total solids from 30 to 50%. Therefore adjustments were made in the volume of polymer latex used and the additional water added. In these examples the amount of magnetic iron oxide was increased to 5.5 g as compared to the 5 g used in the previous experiments.

A typical formulation and procedure is as follows:
- Mix 5.5 g magnetic iron oxide
- 4 ml water
- 0.1 ml Aerosol OT
- 0.1 ml MAZAMIDE 80
- 0.35 ml Additive A (Resorcinol)
- 0.8 ml Additive B (Resorcinol)
- Grind to a smooth paste
- x ml Commercial Latex(s) where x varies between 2.0 and 3.3 ml
- y ml water
- 0.05 ml anti-foam
- Grind and coat Aerosol OT and MAZAMIDE 80 are trademarks of American Cyanamid and Mazer Chemical Company respectively.

All of the coatings prepared in this manner as described in Table II gave good adhesion by the standard tests.

TABLE II

| Exple # | Vol. Latex Used | Vol. Water |
|---|---|---|
| 26 | 3.3 ml Witco Polyurethane W-234 | 2.5 ml |
| 27 | 2.5 ml Mobay Polyurethane Impranil DLH | 3.5 |
| 28 | 2.0 ml Goodrich Hycar 26091 | 3.8 |
| 29 | 2.0 ml Goodrich Hycar 26106 | 3.8 |
| 30 | 2.0 ml Goodrich Hycar 26138 | 3.8 |
| 31 | 2.0 ml Goodrich Hycar 1577 | 3.8 |

In a video tape formulation there are far more stringent requirements on the magnetic oxides as well as the polymer binder. In general special, surface-energized ferrites are used in such formulations when a typical ferrite as supplied by Hercules Powder Company was tested in the above formulations, while excellent wetting was achieved, the flow characteristics leave much to be desired. By replacing the Aerosol OT and MAZAMIDE 80 (Mazer Chemical) combination of surfactants with systems comprising 0.05 ml of Nopcosperse 44 (Diamond-Shamrock), 0.05 ml MAFO 13, MOD 1 and 0.05 ml MAZAMIDE 80 in the formulations of Table II, using 5.5 g magnetic ferrite in place of magnetic iron oxide, excellent film coatings were achieved.

Another surfactant combination that works well with the formulations in Table II is a combination of 0.05 ml Nopcosperse 44, 0.05 ml GAFAC 610 (GAF Corporation) and 0.05 ml Aerosol OT.

Silicone surfactants such as those manufactured by Union Carbide, have been found to produce useful coating dispersions with the polyurethane systems listed in Table II. However, Silwet L-7600 and L-7602 are best used alone, without the aid of other surfactants or dispersants.

EXAMPLE 32

Use of Additive B Based on m-Aminophenol
Mix
    5.5 g Magnetic Ferrite
    4 ml water
    0.10 Mopcosperse 44
    0.05 ml MAFO 13, MOD 1
    0.05 ml MAZAMIDE 80
    0.35 ml Additive A (resorcinol, Ex. 1)
    0.8 ml Additive B (m-aminophenol, Ex. 4B)
Grind to a smooth paste
    2.0 ml Hycar 1577
    3.8 ml water Grind and cast to a tape with excellent adhesive tape, crease and scratch resistance.

EXAMPLE 33

Use of Additives A and B Based on m-Toluene Diamine
Mix
    5.5 g Magnetic Ferrite
    4 ml water
    0.05 ml Nopsocperse 44
    0.05 ml MAFO 13, MOD 1
    0.05 ml MAZAMIDE 80
    0.35 ml Additive A (m-Toluene Diamine, Ex. 5)
    0.8 ml Additive B (m-Toluene Diamine, Ex. 10)
Grind to a smooth paste
    2.0 ml Hycar 26138
    3.8 ml water Grind and cast to yield a film having good adhesive tape, crease and scratch resistance.

It is seen that the magnetically coated structures disclosed herein are useful in the recording of information of various natures including audio, video and computer and other data for both preservation and reproduction of said data. By properly manipulating the ingredients, and the ratio of one to another, which tasks can be accomplished readily by the artisan, the coating films prepared hereunder may be employed for any type of data collection and reproduction. The compositions employed in accordance with the invention are independent of the base or substrate upon which they are coated. Thus any substrate such as polyethylene terephthalate (Mylar ®) cellulose acetate, nylon, among the plastics; and aluminum, copper, and other non-magnetic alloys among the metals. The foregoing examples are merely illustrative of my invention and the invention should not be limited to those described. For example as new commercial latices become available many of them may also be used in my invention. Thus is is possible to consider future latices of polycarbonates or polysulfones as applicable to this invention.

The trademarks referred to above are believed to be of the following chemical compositions as best discernable from literature available to the public:

1. Rhoplex E-358 an acrylic latex produced by Rohm and Haas.
2. UCAR-366 a vinylacetate-butyl acrylate latex produced by Union Carbide
3. UCAR-503 an acrylic copolymer latex produced by Union Carbide
4. Impranil DLH a polyester-polyurethane polymer dispersion produced by Mobay Chemical
5. Witcobond W-234 an aliphatic polyurethane dispersion produced by Witco Chemical
6. Goodrich Hycar latices such as 26091, 26106, 26138 and 1577 are acrylic polymer and copolymer latices of high Durometer hardness produced by B. F. Goodrich
7. Aerosol OT is a salt of a succinosulfate ester produced by American Cynamide
8. Mazamide 80 and 20 are fatty acid amides of diethanol amine produced by Mazer Chemical
9. MAFO 13, MOD 1 is a salt of an amphoteric amino acid surfactant produced by Mazer Chemical
10. Nopcosperse 44 is a salt of a polyacrylic acid produced by Diamond-Shamrock
11. Gafac RE-610 is a surfactant produced by GAF Corp.
12. Silwet L-7600 and L-7602 are silicone surfactants produced by Union Carbide It is seen that the above latices can provide soft or relatively hard coatings. By relatively hard I mean a durometer A hardness of greater than 90.

Since certain changes may be made in the above examples without departing from the scope of the invention involved, it is intended that all matter contained herein should be interpreted as limiting.

I claim:

1. A water based dispersion system for coating magnetic particles onto a substrate comprising:
water sufficient to form a dispersion, at least one adhesive plasticizer (Additive A), at least one adhesive polymer (Additive B), at least one surface active agent, an optional dispersing agent, at least one polymeric latex capable of binding magnetic particles into a coating, wherein Additive A is of the general formula

Y—CO—NX—CH$_2$—P and Y is selected from the group consisting of H, an akyl group of C$_1$-C$_4$, an alkylene group of C$_2$-C$_3$, an ethanol, propanol or isopropanol group, a 2-3 carbon ether group, and a C$_1$-C$_3$ haloalkyl group, said halo selected from the group consisting of being chloro or fluoro, and wherein Additive B is a water soluble or dispersible polymer which was formed by the copolymerization of a first component which has at least 5% of its monomer constituents being derived from a monomer selected from the group consisting of acrylamide and methacrylamide, and the balance being a second component of one or more vinyl monomers copolymerizable with said first component, thereby having yielded an amido copolymerizate, said amido copolymerizate having been further condensed with formalhehyde to the extent of from 5% to 95% of the amide groups, said condensed amido copolymerizate having been still further condensed with a member selected from the group consisting of a polyhydroxy aromatic compound, an amido hydroxy aromatic compound, or a diamino aromatic compound, and sufficient magnetic particles of a size suitable for dispersion as a magnetic film upon a substrate.

2. As a new composition for use in the magnetic particle coating of substrates from a water based composition, which composition comprises a water soluble or water dispersable mixture of Additive A and Additive B, wherein Additive A is at least one adhesive plasticizer and Additive B is at least one adhesive polymer,
  wherein the adhesive plasticizer Additive A, is a condensation product of N-hydroxymethyl acrylamide with a soluble compound selected from the group consisting of polyhydroxyaromatic compounds, aminophenols and aromatic diamines;
  and wherein the adhesive polymer, Additive B, is a condensation product of polymers and copolymers of acrylamide with a partial molecular equivalent of formaldehyde, followed by further condensation with a soluble compound selected from the group consisting of polyhydroxy aromatic compounds, aminophenols and aromatic diamines.

3. In the composition of claim 2 wherein Additive A is a condensation product of N-hydroxymethyl acrylamide with a polyhydroxy aromatic compound, wherein said polyhydroxy aromatic compounds are selected from a group consisting of resorcinol, catechol, hydroquinone, hydroxyethyl resorcinol and n-butyl catechol.

4. In the composition of claim 2 wherein Additive A is a condensation product formed from the reaction of N-hydroxymethyl acrylamide with aminophenols, said aminophenols being selected from the group consisting of o,m and p-aminophenol, the methyl aminophenols and the hydroxyethyl aminophenols.

5. In the composition of claim 2 wherein Additive A is a condensation product formed from the reaction of N-hydroxymethyl acrylamide with aromatic diamino compounds, such members of the diamino aromatics being selected from the o,m and p-diamino benzenes, the o,m and p-diamino toluenes and the various isomers of the hydroxyethyl diamino benzenes.

6. In the composition of claim 3 wherein Additive B is a condensation product of polymers and copolymers of acrylamide with a partial molecular equivalent of formaldehyde, followed by a further condensation with a soluble compound selected from the group consisting of a polyhydroxy aromatic compound selected from the group consisting of resorcinol, catechol, hydroquinone, hydroxyethyl resorcinol and n-butyl catechol.

7. In the composition of claim 3 wherein Additive B is a condensation product of polymers and copolymers of acrylamide with a partial molecular equivalent of formaldehyde, followed by further condensation with a soluble aminophenol compound selected from the group consisting of o,m and p-aminophenol, the methyl aminophenols and hydroxyethyl aminophenols.

8. In the composition of claim 3 wherein Additive B is a condensation product of polymers and copolymers of acrylamide with a partial molecular equivalent of formaldehyde, followed by further condensation with a soluble aromatic diamine selected from the group consisting of o,m and p-diamino benzene, diaminotoluenes and the hydroxyethyl diaminobenzenes.

9. A water based dispersion system for coating magnetic particles onto a substrate composition as in claim 1 wherein there is water sufficient to form a dispersion of the magnetic particles with proportional amounts of Additives A and B and a commercial aqueous latex capable of binding magnetic particles.

10. The system as in claim 9 wherein the commercial latices are chosen to provide a relatively soft coating and which latices are selected from the group consisting of acrylic copolymers as represented by the commercial designations Rhoplex E-358, UCAR 366 and UCAR 503.

11. The system as in claim 9 wherein the commercial latices are chosen to provide a relatively hard coating and are selected from the group consisting of acrylic copolymers and polyurethane aqueous dispersions.

12. In the compositions of claim 11 wherein the latices providing relatively hard acrylic copolymers are compositions bearing the commercial description Hycars 26091, 26106, 26138 and 1577.

13. In the composition of claim 11 wherein the polyurethane dispersions are compositions bearing the commercial designations Witcobond W 234 and Impranil DLH.

14. In the system of claim 1 wherein the surface active agent is a mixture of a higher alkyl succino sulfate and a fatty acid amide of diethanolamine.

15. In the system of claim 1 wherein the surface active agent is a mixture of a fatty acid amide of diethanolamine and a salt of a complex amphoteric aminoacid.

16. In the system of claim 1 wherein the surface active agent is one member of the group consisting of a mixture of a higher alkyl succino sulfate and a complex organic phosphate ester acid and a surface active silicone compound.

17. In the system of claim 1 wherein the composition further including a dispersant which is a low molecular weight salt of polyacrylic acid.

18. A water based dispersion system for coating magnetic particles onto a substrate comprising:
  I. water sufficient to form a dispersion,
  II. a magnetic iron oxide suitable for audio, video and data recording,
  III. an adhesive plasticizer, Additive A, prepared by the combination of N-hydroxymethyl acrylamide with a compound Y,
  IV. an adhesive binder Additive B, which binder is prepaid by the condensation of polymers and copolymers of acylamide with about 0.25 molecular equivalent of a compound Y;

wherein said compound Y is selected from the group consisting of polyhydroxy aromatics, the amino phenols and the aromatic diamines V. a commercial latex selected from the soft and hard coating polymers of acrylic copolymers and polyurethanes, VI. a surfactant VII. an optional dispersant.

19. A water based dispersion for coating magnetic particles onto a substrate comprising:

water sufficient to form a dispersion with all of the following: a high coercivity magnetic iron oxide, an adhesive plasticizer prepared by the condensation of N-hydroxymethyl acrylamide with an equivalent amount of resorcinol:

an adhesive binder prepared by the condensation of a polyacrylamide with one-fourth the molecular equivalent of formaldehyde followed by further condensation with catechol, a polyurethane latex, a surfactant mixture of an oleic acid amide of diethanolamine and a salt of a complex amphoteric amino acid, a dispersant of a salt of a low molecular weight polyacrylic acid and an optional anti-foam agent.

20. The composition of claim 3 further including a water dispersible latex capable of binding magnetic particles.

21. A magnetic tape composition suitable for coating as in claim 1 comprising about 5.5 grams of magnetic ferrite, about 4 ml water, about 0.35 ml of a resorcinol based Additive A;

about 0.8 ml of meta-aminophenol based Additive B;

a polymeric latex, a dispersing agent, a surface active agent, and additional water for processing.

22. In the composition of claim 21 wherein the Additive A and the Additive B are each meta-toluene diamine based.

* * * * *